Jan. 15, 1957 I. J. SPIRO ET AL 2,777,940

TELEPHONE ILLUMINATOR

Filed Nov. 2, 1953

INVENTOR.
LEONARD E. MARLOW
IRVING J. SPIRO

BY

Fred N. Schwend

ATTORNEY

2,777,940

TELEPHONE ILLUMINATOR

Irving J. Spiro, Sherman Oaks, and Leonard E. Marlow, North Hollywood, Calif., assignors to Borman Engineering, Inc., North Hollywood, Calif., a corporation of California Application November 2, 1953, Serial No. 389,632

6 Claims. (Cl. 240—2.17)

This invention relates to illuminating devices, and has particular reference to a light attachment for telephone instruments.

In many instances telephones and accessories such as directories associated with such telephones are located in out-of-the-way places where general illuminating conditions are bad, making it desirable to provide separate artificial illumination in order to facilitate reading the telephone dials, directories, etc.

Often such illuminating means must be turned on by a switch located remotely from the telephone each time the latter is used. This results in inconvenience and loss of time.

An object of the present invention is to provide an illuminating device for a telephone and/or accessories therefor which is readily available to the telephone user.

Another object is to provide an illuminating device carried by a portable telephone instrument and operable by the same hand which is used to hold the instrument.

Another object is to provide an illuminating device carried by a portable telephone instrument which is compact, does not affect the handling or operation of the instrument, and fits the contour thereof.

A further object is to provide an attachable illuminating device for a portable telephone instrument in which the instrument need not be reworked, changed or marred in order to secure the attachment thereto.

Another object is to provide an attachable illuminating device for a portable telephone instrument in which the device may be readily attached or removed without requiring the use of a screwdriver or other tool.

A still further object is to provide an attachable illuminating device for a portable telephone instrument which is simple and economical to manufacture.

The manner in which the above and other objects of the invention are accomplished will be readily understood on reference to the following specification when read in conjunction with the accompanying drawings wherein.

Figures 1, 2:
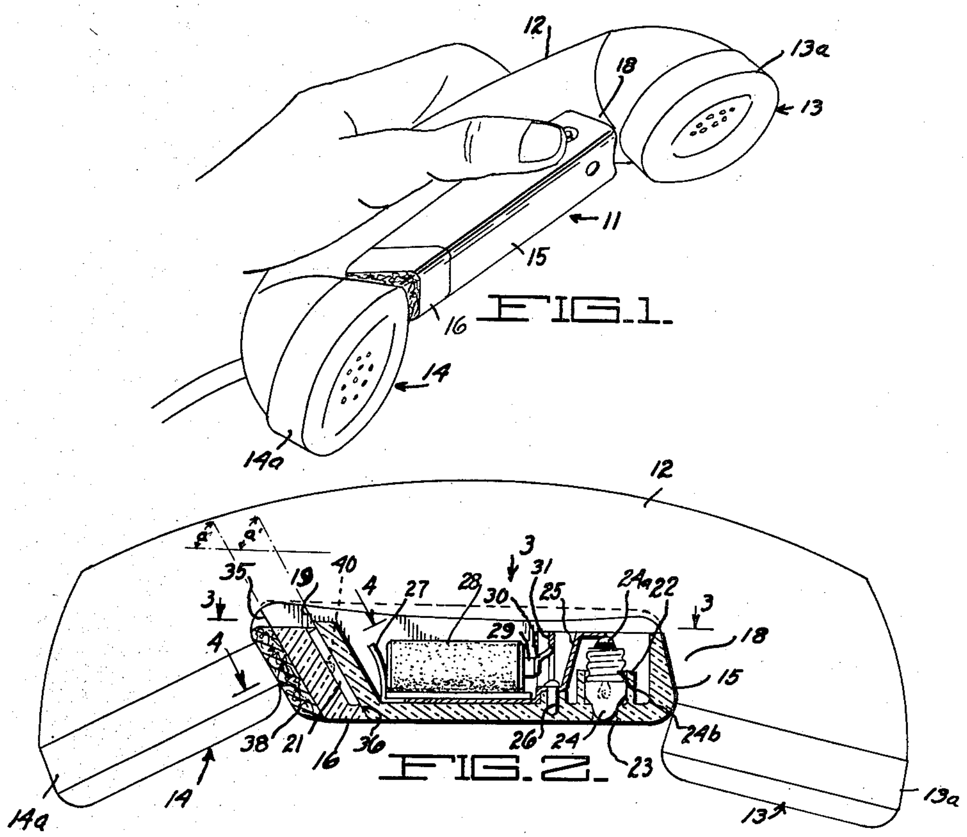
Fig. 1 is a perspective view of an illuminating device embodying a preferred form of the invention and illustrating the same attached to a portable telephone instrument.
Fig. 2 is a side view of a telephone instrument illustrating in section the illuminating device, the latter section being taken along the line 2—2 of Fig. 3.

Referring in particular to Figs. 1 and 2 of the drawings, the illuminating device generally indicated at 11 is shown attached to a conventional portable telephone instrument. The latter comprises an elongate handle 12, a receiver head 13 and a transmitter head 14. The heads 13 and 14 extend laterally from the opposite ends of the handle and their outer rims 13*a* and 14*a*, respectively, are substantially cylindrical in shape.

It will be noted, particularly in Fig. 2, that the heads 13 and 14 are not symmetrically arranged on the opposite ends of the handle 12, but the head 14 extends at a greater angle to the length of the handle, and is somewhat closer to the body thereof than is head 13.

Figure 3:
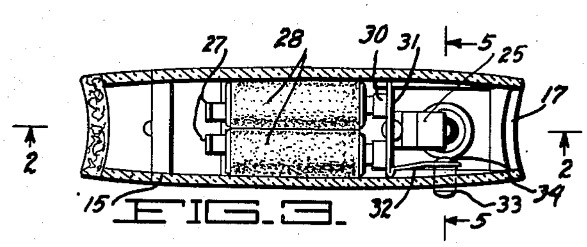
Fig. 3 is a plan view of the device and is taken in the direction of the arrow 3 of Fig. 2.

The illuminating device comprises a casing element 15, preferably of plastic material, and a spacer element 16 arranged end to end when attached to the instrument. The casing is hollow and open at the side thereof adjacent the handle. As shown in Fig. 3, the end 17 thereof is arcuate in shape to fit partly around a web 18 extending between the handle 12 and the head 13 to locate this end of the casing in place.

Figure 4:
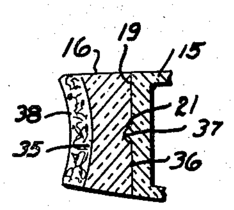
Fig. 4 is a transverse sectional view illustrating the means for interlocking parts of the device, and is taken along the line 4—4 of Fig. 2.
Figure 5:
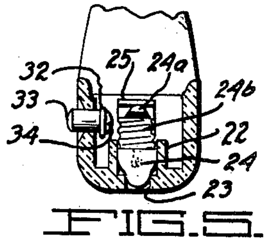
Fig. 5 is a transverse sectional view taken along the line 5—5 of Fig. 3.

The opposite end 19 of the casing is flat, as shown in Fig. 4, but extends at an angle of approximately 60° to the length of the handle and substantially parallel to the adjacent portion of the rim 14*a* forming part of the transmitter head 14. A guide rib 21 is formed integral with the end 19 and terminates a short distance from the outer face of the casing for the purpose to be described later.

A socket 22 is formed in the casing adjacent the head 13 and is aligned with an opening 23 extending through the wall of the casing to slidably receive a commercially available electric light bulb 24 of conventional shape. The bulb includes a tip 24*a* forming one terminal and a threaded shell 24*b* forming the second terminal.

The bulb 24 is held in place in the socket by a leaf spring 25 forming an electric terminal connection for the tip 24*a* of the bulb. The spring is bent to lie along the bottom wall of the casing and is secured in position by a drive pin 26. The opposite end of the spring is bifurcated and the resulting legs 27 are bent upwardly to engage the rear ends of a pair of cylindrical batteries 28.

The batteries 28 are fitted side by side in the casing with their positive electrodes 29 engaging spring tabs 30 extending from a metal spring bar 31. The latter is fitted within vertically extending slots 32 formed in the opposite side walls of the casing.

The spring bar 31 is bent to form a resilient switch arm 32 having attached to the free end thereof a pushbutton 33 and a metallic contact 34. The pushbutton extends through an opening in the side wall of the casing so that manual depression thereof will cause the contact 34 to engage the shell 24*b* of the light bulb 24, thus completing a circuit through the battery and light to illuminate the latter. Light rays from the light are transmitted in a beam by the opening 23 in a direction toward which the instrument is pointed.

The spacer 16, which is preferably formed of plastic material, has both ends 35 and 36 thereof formed parallel to each other and extending at the same angle to the length of the handle as the end 19 of casing 15. A groove 37 is formed in the end 36 of the spacer to slidably receive the aforementioned rib 21. A pad 38 of resilient material, preferably felt, is cemented or otherwise suitably attached to the arcuate end 35 of the spacer, whereby to frictionally engage the inner side 20 of rim 14*a* of the instrument head 14.

In attaching the illuminating device to the instrument, the casing 15 is first mounted in place with its arcuate end 17 against the web 18. Thereafter, the spacer 16 is slipped into place, wherein it is held by both the endwise pressure exerted by the resilient pad 38, and also by the frictional engagement of said pad with the rim 14*a* of the transmitter head.

The guide means formed by the rib 21 and guide slot 37 prevents lateral movement of the casing and spacer at their interfitting ends, while the inclined formation of the interfitting ends and the engagement of the outer end of rib 21 with the outer end of the slot 37 prevents outward movement of the casing relative to the handle.

In order to insure that the spacer 16 and casing 15 do not move relative to each other during normal usage, a small convex nub or bump 40 is formed on the spacer at the bottom of the guide slot 37. The nub fits within a mating concave depression in the rib 21.

Although the spacer is normally locked in place by virtue of the engagement of the nub 40 with the depression in the rib 21, it can be forced outward to disassemble the parts when desired. During such movement the pad 38 is compressed slightly.

Although the ends 35 and 36 have previously been described as extending parallel to each other, it may be preferable to form the same at a relatively slight angular relationship to each other in order to create a wedging action against the felt as the spacer and casing are assembled on the telephone instrument. For example, the end 35 is formed at an angle *a* of 60° and the end 36 is formed at an angle *a'* of 61°.

From the foregoing it will be seen that the illuminating device fits the contour of the telephone instrument and does not in any way affect its operation. When grasping the instrument in the normal manner as indicated in Fig. 1, the switch pushbutton is located directly under the thumb and the light is located to direct a beam in whichever direction the instrument is pointed.

Although we have described our invention in detail in its preferred form and have therefore used specific terms and languages here, it is to be understood that the present description is illustrative rather than restrictive and that changes and modifications may be made thereto without departing from the spirit or scope of the claims appended hereto. For example, the casing may be formed of transparent material, in which event the opening 23 through the wall thereof may be omitted.

Having thus described the invention, what we desire to secure by United States Letters Patent is:

1. A light attachment for a portable telephone instrument having an elongate handle and telephone instrument heads extending laterally from opposite ends of said handle, comprising an elongate rigid casing element, illuminating means carried by said casing element, a rigid spacer element, said elements having interlocking end faces, said elements being arranged to fit end to end between said instrument heads and in engagement with the side of said handle, and resilient means on the end face of one of said elements opposite said interlocking end faces, said resilient means being engageable with one of said heads whereby to yieldably retain the end face of the other of said elements opposite said interlocking end faces against the other of said heads to maintain said elements on said instrument and parallel to the length of said handle.

2. A light attachment for a portable telephone instrument having an elongate handle and telephone instrument heads extending laterally from opposite ends of said handle, comprising an elongate rigid casing element, illuminating means carried by said casing element, a rigid spacer element, said elements being arranged to fit end to end between said instrument heads and in engagement with the side of said handle, guide means on the interfitting ends of said elements, said guide means comprising a tongue on one of said elements and a groove in the other of said elements engageable with said tongue; said guide means permitting lateral movement of said one of said elements relative to the other and in a direction extending away from said handle, said guide means preventing movement of said last-mentioned element in any other direction, and resilient means on the end of said other of said elements opposite said interfitting ends, said resilient means being engageable with one of said heads whereby to yieldably retain the end of said one of said elements opposite said interfitting ends against the other of said heads to maintain said elements on said instrument and parallel to the length of said handle.

3. A light attachment for a portable telephone instrument having an elongate handle and telephone instrument heads extending laterally from opposite ends of said handle, comprising an elongate rigid casing element, illuminating means carried by said casing element, a rigid spacer element, said elements being arranged to fit end to end between said instrument heads and in engagement with the side of said handle, and a pad of resilient material on the end of said spacer element opposite the interfitting ends of said elements, said pad being engageable with one of said instrument heads whereby to yieldably retain the end of said casing element opposite said interfitting ends against the other of said heads to maintain said elements on said instrument and parallel to the length of said handle.

4. A light attachment for a portable telephone instrument having an elongate handle and telephone instrument heads extending laterally from opposite ends of said handle, comprising an elongate rigid casing element, illuminating means carried by said casing element, a rigid spacer element, said elements being arranged to fit end to end between said instrument heads and in engagement with the side of said handle, and resilient material on the end of said spacer element opposite said interfitting ends of said elements, said resilient material being engageable with one of said instrument heads whereby to yieldably retain the end of said casing element opposite said interfitting ends against the other of said heads to maintain said elements on said instrument and parallel to the length of said handle, said interfitting ends of said elements and the opposite ends of said spacer element extending parallel to each other and at an angle of less than 90° to a side of said casing along the length thereof.

5. A portable telephone instrument having an elongate handle, telephone instrument heads extending laterally from opposite ends of said handle, an elongate rigid casing element, a rigid spacer element, said elements being arranged to fit end to end between said instrument heads and in engagement with said handle, said elements having a configuration substantially conforming to the configuration of the adjacent portions of said instrument, a pad of resilient material on one of said elements, said pad being engageable with one of said heads whereby to yieldably retain the end of the other of said elements opposite said interfitting ends against the other of said heads to maintain said elements on said instrument, an electric light in said casing element adjacent the end thereof opposite said interfitting ends, a battery in said casing, and a switch in said casing in circuit with said light and said battery, said switch including a manually operable element accessible from the exterior of said casing element adjacent said last mentioned end.

6. A portable telephone instrument having an elongate handle, telephone instrument heads extending laterally from opposite ends of said handle, an elongate rigid casing element, a rigid spacer element, said elements being arranged to fit end to end between said instrument heads and in engagement with said handle, resilient means on one of said elements, said resilient means being engageable with one of said heads whereby to retain the end of the other of said elements opposite said interfitting ends against the other of said heads to maintain said elements on said instrument and parallel to the length of said handle, guide means on the interfitting ends of said elements, said guide means comprising a tongue on said other of said elements and a groove in said one of said elements engageable with said tongue, said guide means permitting lateral movement of said other of said elements relative to said one of said elements and in a direction extending away from said handle, said guide means preventing movement of said last mentioned element in any other direction, an electric light in said casing element adjacent the end thereof opposite said interfitting ends, a battery in said casing, and a switch in said casing in circuit with said light and said battery, said switch including a manually operable element accessible from the exterior of said casing element adjacent said last-mentioned end.

References Cited in the file of this patent

UNITED STATES PATENTS

| | | |
|---|---|---|
| 1,918,876 | Smith | July 18, 1933 |
| 1,961,474 | Baum | June 5, 1934 |
| 2,298,207 | Gent | Oct. 6, 1942 |
| 2,332,362 | Bartow | Oct. 19, 1943 |
| 2,610,262 | Cunningham | Sept. 9, 1952 |
| 2,681,979 | Manoloff | June 22, 1954 |